United States Patent [19]

Saitoh

[11] Patent Number: 4,633,301
[45] Date of Patent: Dec. 30, 1986

[54] METHOD AND APPARATUS WITH WHITE BALANCING CORRECTION FOR SEPARATING A COLOR SIGNAL AND ITS COMPLEMENT

[75] Inventor: Hiroyuki Saitoh, Ebina, Japan

[73] Assignee: Fuji Xerox Co., Ltd., Tokyo, Japan

[21] Appl. No.: 516,805

[22] Filed: Jul. 25, 1983

[30] Foreign Application Priority Data

Jul. 30, 1982 [JP] Japan .................................. 57-134405

[51] Int. Cl.$^4$ .......................... G03F 3/08; H04N 9/73; G01J 3/46; G01J 3/50
[52] U.S. Cl. ......................................... 358/75; 358/29; 250/226; 356/402; 356/416
[58] Field of Search ................. 250/226; 356/402, 406, 356/416, 425; 358/29, 75, 80, 163, 78; 382/17

[56] References Cited

U.S. PATENT DOCUMENTS

| 3,127,517 | 3/1964 | Kestenbaum | 250/226 |
|---|---|---|---|
| 4,136,360 | 1/1979 | Hoffrichter et al. | 358/80 |
| 4,381,520 | 4/1983 | Machida et al. | 358/29 |
| 4,479,242 | 10/1984 | Kurata | 358/75 |

FOREIGN PATENT DOCUMENTS

| 2559826 | 4/1979 | Fed. Rep. of Germany | 358/80 |
|---|---|---|---|
| 8159 | 1/1978 | Japan | 358/75 |
| 112685 | 8/1980 | Japan | 358/163 |
| 58370 | 5/1981 | Japan | 358/75 |

Primary Examiner—James J. Groody
Assistant Examiner—Randall S. Svihla
Attorney, Agent, or Firm—Spensley Horn Jubas & Lubitz

[57] ABSTRACT

A method and apparatus for processing image signals in which image sensors produce an image signal of a specific color and an image signal of the complementary color from a color image of an original by means of filters. A white balancing correction is applied to these image signals by selectively adjusting at least one of the image signals so that the image signals are equal to one another for each picture element along the scanning direction, while a white area of the original or a reference area is being scanned. In a preferred embodiment, a digital signal representative of a specific color is obtained by attenuating the white balanced image signal of the specific color and comparing it to the white balanced image signal of the complementary color, whereby faithful color separation of the specific color is achieved.

14 Claims, 10 Drawing Figures

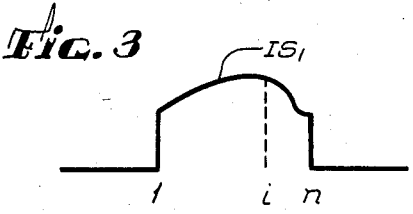
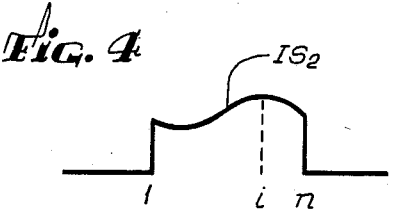
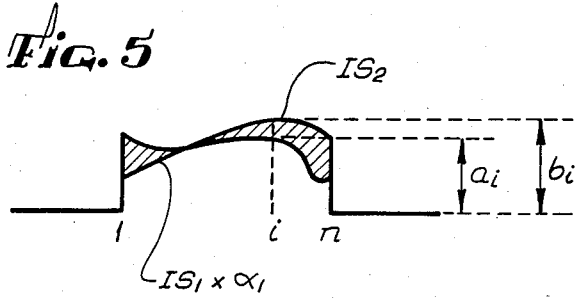
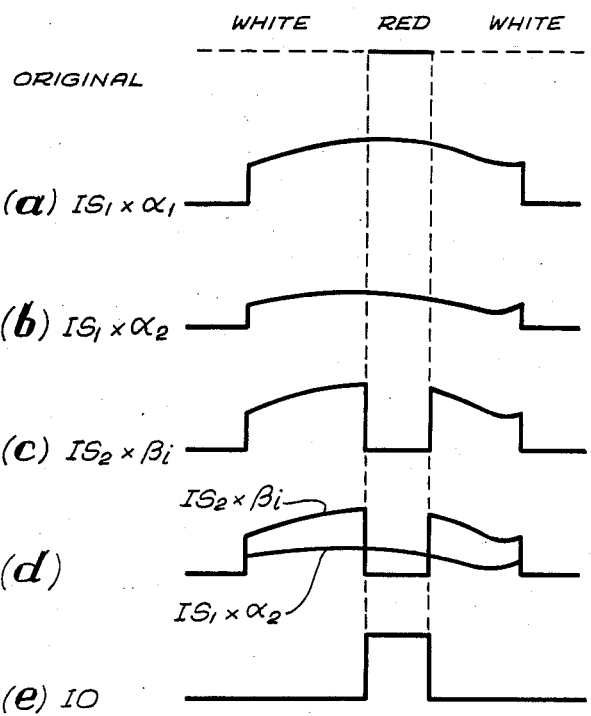

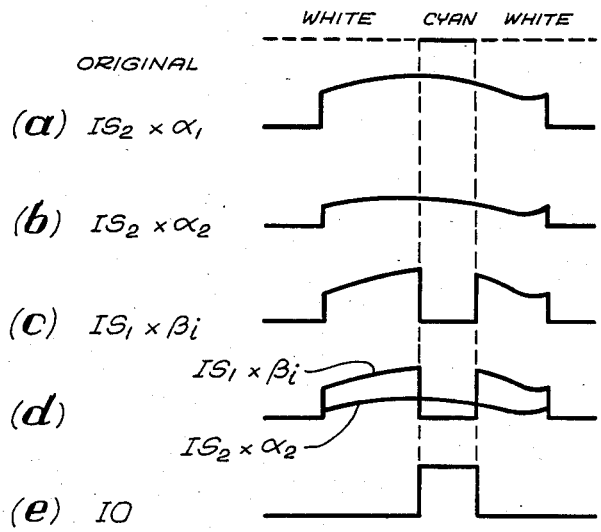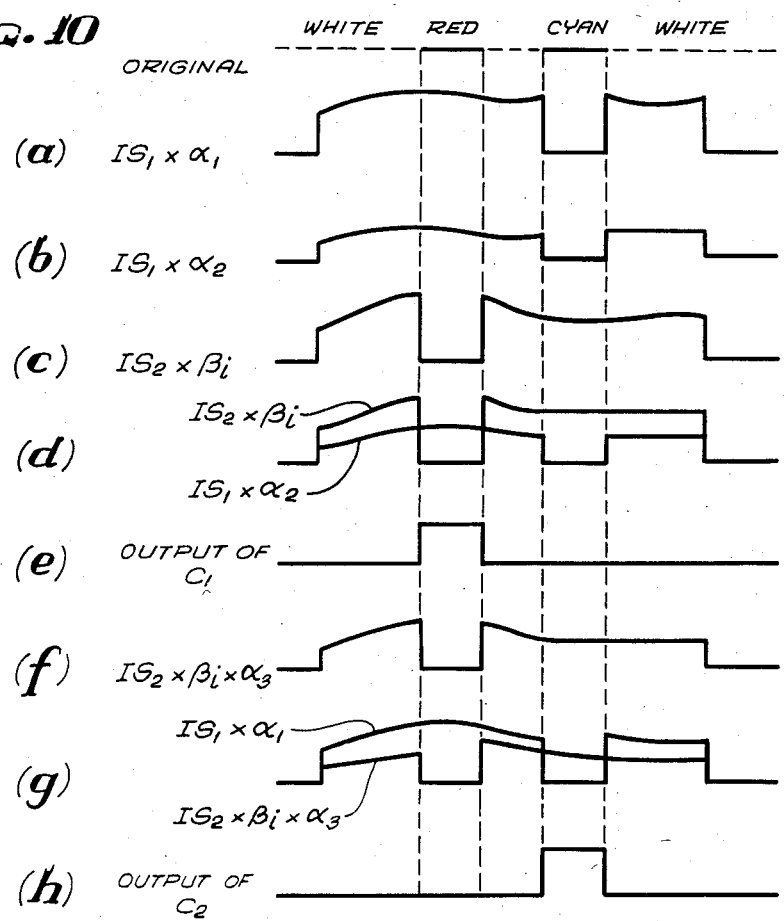

METHOD AND APPARATUS WITH WHITE BALANCING CORRECTION FOR SEPARATING A COLOR SIGNAL AND ITS COMPLEMENT

BACKGROUND OF THE INVENTION

1. Field of the Invention

This invention relates to a method and apparatus for processing image signals in a color image reader and particularly to a method and apparatus for separating an image signal of a specific color from the image signal of its complementary color wherein a light signal from a color image is optically split into a light signal of the specific color and a light signal of the complementary color by means of a filter and these two light signals are photoelectrically converted and then compared with each other.

2. Description of the Prior Art

In general, a conventional color image reader is constructed so that a color signal from a color image is optically split into at least two light signals by means of a filter, a dichroic mirror or the like. Thereafter, these light signals are photoelectrically converted and predetermined processing is done on the image signals which were obtained by the above photoelectrical conversion, whereby the image signal of the specific color is separated, in other words, color separation is attained.

Color image signal processors for effecting such color separation have heretofore been of the following types:

(1) Image signals obtained by the above photoelectrical conversion are converted to binary values, i.e., digitized by comparing them with respective predetermined threshold values, and an image signal of a specified color is separated by executing logical operations on these binary-valued signals.

(2) Image signals obtained by the photoelectrical conversion are subjected to analogue operations to form analogue image signals and these analogue image signals are converted to binary values, i.e., digitized, by comparing them with respective threshold values, and an image signal of the specific color is separated by executing logical operations on these binary-valued signals.

In each of the above processors, image signals of a desired color are separated by comparing the image signals with certain threshold values. The comparison operation is disadvantageous in that it is difficult to obtain an image signal of a specific color whose luminance is low.

Furthermore, because of the variation in brightness of a light source for irradiating an original as well as the variation in sensitivity of the photoelectric conversion for each picture element, the image signals subjected to color separations are not uniform for all the picture elements so that the quality of the image obtained is deteriorated.

Accordingly, it is an object of the present invention to provide a method and apparatus for processing an image signal of simple construction wherein white balancing correction is effected, and at the same time, color separation is attained irrespective of the original's luminance, whereby a highly reliable image information signal is obtained.

SUMMARY OF THE INVENTION

In accordance with the present invention, an image signal of a specific color and an image signal of the complementary color are obtained by means of filters, a white balancing correction is applied to these image signals, and digitization is carried out on the basis of the extent of the differences in the levels of both image signals for corresponding picture elements, whereby faithful color separation of the specific color becomes possible.

More specifically, according to the present invention, there is proposed a method for processing an image signal in which an image signal of a specific color is separated from a light signal containing image information. The method comprises the steps of splitting said light signal into a first light signal containing image information of the specific color and a second light signal containing image information of the complementary color with respect to said specific color; photoelectrically converting said first and second light signals to first and second electrical signals corresponding respectively thereto; effecting a "white balancing" correction by increasing or decreasing at least one of said electrical signals with the correction determined for each picture element in such a manner that both electrical signals are made equal to each other for each picture element along the main scanning direction; and producing the image signal of said specific color from the relationship between two electrical signals to which said white balancing correction has been applied.

In the method according to the present invention, the splitting step may be carried out by the use of either a combination of a semi-transparent mirror with filters, or a dichroic mirror. The white balancing correction step may be carried out by attenuating the first and second signals by a first attenuator circuit and a second attenuator circuit, respectively. The attenuation factor of either one of said first attenuator circuit or said second attenuator circuit is set for each picture element in a scanning line such that said first and second signals are made equal to each other with respect to each picture element. The producing step may be carried out as follows: a signal corresponding to said specific color is selected from two electrical signals which have been subjected to said white balancing correction and is attenuated by a predetermined attenuation factor; the signal thus attenuated is compared with the signal corresponding to the color complementary to said specific color thereby separating and producing the image signal of said specific color.

BRIEF DESCRIPTION OF THE DRAWINGS

In the accompanying drawings:

FIGS. 3-5 are graphical representations showing examples of image signals;

FIGS. 6(a)-6(e) are graphical representations showing a method of obtaining a digital representation of a color-separated image information signal;

FIGS. 9(a)-9(e) are graphical representations showing a method of obtaining a digital representation of a color-separated image information signal of a complementary color; and FIGS. 10(a)-10(h) are graphical representations showing a method of obtaining digital representations of a color-separated image information signal of a specific color and a complementary color.

DESCRIPTION OF THE PREFERRED EMBODIMENTS

Figure 1:
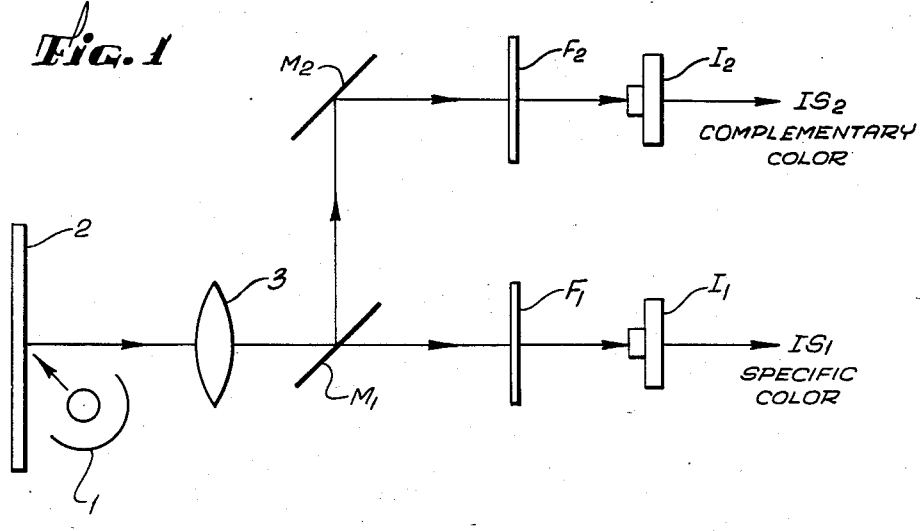
FIG. 1 is a schematic view illustrating a method for obtaining image signals of a specific color and its complementary color.

Referring to FIG. 1, light emitted from a light source 1 and reflected at picture elements on an original 2 is passed through a lens 3, and is divided into two beams by means of a semi-transparent mirror $M_1$ and a mirror $M_2$. Then, these beams are directed to image sensors $I_1$ and $I_2$ through filters $F_1$ and $F_2$ for the specific color and the complementary color, and are photoelectrically converted in the image sensors $I_1$ and $I_2$ to obtain image signals $IS_1$ and $IS_2$, respectively. The image sensors, $I_1$ and $I_2$ may be linear multi-element devices, the image signals $IS_1$ and $IS_2$ being signals corresponding to a line of picture elements.

Figure 2:
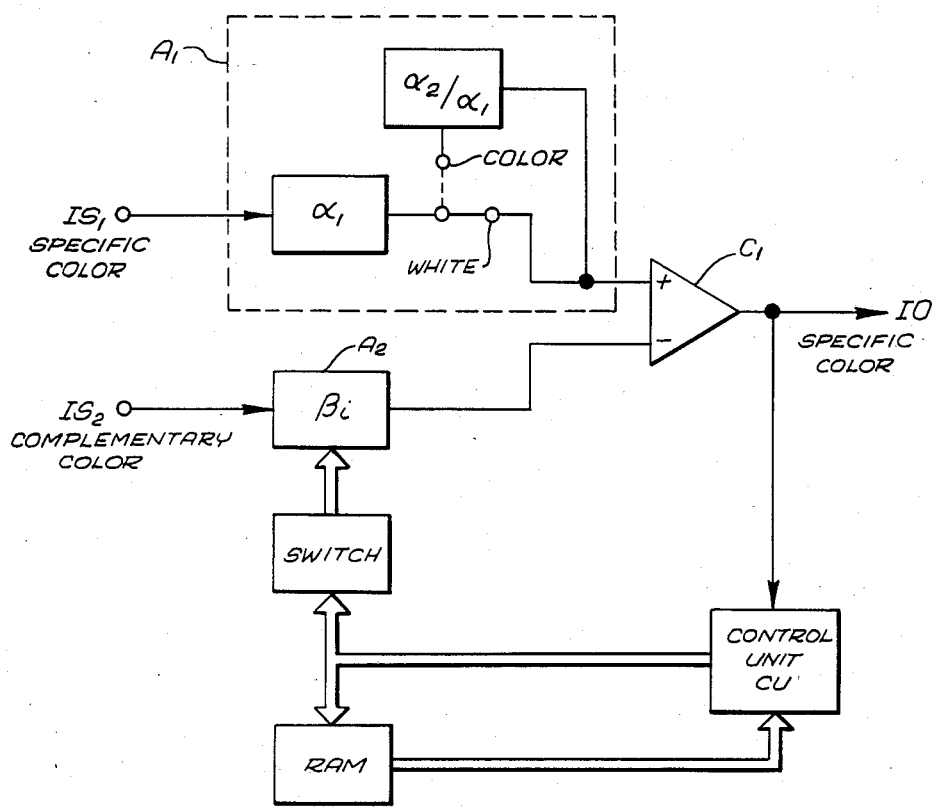
FIG. 2 is a block diagram illustrating an embodiment of a color image signal separation unit according to the present invention.

Referring to FIG. 2, the image signal $IS_1$ of the specific color and the image signal $IS_2$ of the complementary color are applied to a color image signal separation unit wherein a white balancing correction is effected and a precise color separation signal with respect to the specific color not influenced by fluctuations in luminance is produced.

First, the white balancing correction will be described.

Assume that there are n picture elements along one scanning line. When a white portion of the original is scanned, the image signal $IS_1$ is, for example, as shown in FIG. 3, while the image signal $IS_2$ is, for example, as shown in FIG. 4. Variations in level of the image signals $IS_1$ and $IS_2$ in respect of each picture element are caused by unevenness of brightness of the light source 1, variation in the characteristics of the optical systems, and the nonuniformity of sensitivity of the image sensors $I_1$ and $I_2$.

In the present invention a white balancing correction is performed by making both image signals $IS_1$ and $IS_2$ coincide with each other, i.e., equal for each picture element.

Referring again to FIG. 2, if the attenuation factor of an attenuator $A_1$ is represented by $\alpha_1$, the factor $\alpha_1$ is selected so that the relationship of $IS_1 \times \alpha_1 < IS_2$ is established for each picture element.

When the signal $IS_1 \times \alpha_1$ is superimposed on the image signal $IS_2$, the graphical representation shown in FIG. 5 is obtained. In FIG. 5, the shaded portion represents the difference between these signals. From FIG. 5, it is apparent that both signals can be made to coincide by attenuating the image signal $IS_2$ by an amount corresponding to the shaded portion for each picture element or bit. Assuming that the level of $IS_1 \times \alpha_1$ for the ith bit is ai, and the level of $IS_2$ is bi (i=1 to n), both image signals can be made to coincide by attenuating the respective bits of $IS_2$ by the ratio of $ai/bi = \beta_i$.

Since the attenuator $A_1$ provides a constant attenuation factor $\alpha_1$ with respect to all the bits, an attenuator of the usual type may be employed.

The attenuator $A_2$ is of a type whose attenuation factor differs for each bit or picture element, and therefore a programmable attenuator whose attenuation factor can be varied in accordance with a digital signal is utilized. For instance, if the attenuation factor of the attenuator $A_2$ is controlled by a digital signal of 8 bits, $2^8$ (=256) attenuator levels can be produced.

During a period when the blank space (white part) of the original is being scanned by the optical system, the digital signals for determining attenuation factors with respect to each picture element are determined and stored in a random access memory RAM. The digital signals are decided beginning with the most significant bit. The manner in which the digital signals are determined will be described hereinbelow.

Returning to FIG. 2, the random access memory RAM is initially cleared, and an ON signal (e.g., 1) is added to the most significant bit from a control unit CU. In this case, the ON signal is a signal for turning a switching element SW in the programmable attenuator $A_2$ on, while an OFF signal is one for turning the switching element SW off. The output of the attenuator $A_2$ becomes $IS_2/2$ by the above ON signal, and the output $IS_2/2$ is compared with $IS_1 \times \alpha_1$ in a comparator $C_1$. Based on such comparison, either an ON signal (1) or an OFF signal (0) is stored in the most significant bit $b_7$ of the random access memory RAM when $IS_2/2 > IS_1\alpha_1$ or $IS_2/2 < IS_1\alpha_1$, respectively. Such operation as described above is executed for all the picture elements of the blank space along the scanning line.

Next, the contents which have been stored in the random access memory RAM as mentioned above are read out, and at the same time, an ON signal (1) is added to the next lower bit from the control unit CU to perform the same operation as that described above, whereby ON/OFF signals are stored in the RAM.

In this same manner, all the bits for the digital signals for making both image signal $IS_1$ and $IS_2$ coincide for all of the white picture elements can be determined and stored.

In the case where the digital signals are determined beginning with the most significant bit for all the picture elements of one scanning line, as in the example as described above, it is required to scan the entire blank space along the scanning line eight times. However, it may, of course, be possible to determine and store all bits of the digital signal for each picture element at one time by slowing down the scanning speed.

Although the above description has been made with reference to the case where white portions of the original are scanned, the present invention is not limited to the above case, but may be carried out by scanning a white body separately provided in the apparatus prior to the scanning of the original.

Furthermore, while the above description is for the case where the ratio between $IS_1 \times \alpha_1$ and $IS_2$ ($IS_1 \times \alpha_1/IS_2 = \beta_i$) is within the range of 0 to 1, the ratio $\beta_i$ is generally around 0.5 to 0.6, so that the ratio $\beta_i$ may be represented by 256 steps within a range of 0.5 to 1.

Now the manner of digitizing will be described hereinbelow.

In the digitization method according to the present invention, comparisons of each image signal with respective threshold values are not made. Instead, the variation in the difference of the levels of the image signals of the specific color and the complementary color is examined. For this purpose, the attenuation of the image signal $IS_1$ of the specific color is significantly increased, i.e., the attenuation factor $\alpha_2$ is significantly decreased (for example, $\alpha_2 = 0.1\alpha_1$ to $0.2\alpha_1$). The attenuator $A_2$ reads out RAM synchronously with the image signal of the complementary color and attenuates it with an attenuation factor $\beta_i$ for each picture element.

Assuming now that the specific color is, for example, red, light beams are separated by means of a red filter and a cyan filter (cyan is the complementary color of red), and, respectively, projected on to the image sensors $I_1$ and $I_2$. The change in the image signal of the complementary color with respect to red picture elements is remarkable while the change in the image signal of the specific color with respect to the red picture elements is small.

Referring to FIG. 2, the attenuation $A_1$ is switched from "white" to "color", switching an attenuation of $\alpha_2/\alpha_1$ in series with the attenuation $\alpha_1$, changing the attenuation factor of $A_1$ from $\alpha_1$ to $\alpha_2$. By comparing $IS_1 \times \alpha_2$ with $IS_2 \times \beta_i$ for each picture element, a signal, IO, having a certain nonzero level appears at the output of the comparator $C_1$ only in the case where the picture elements are red.

FIGS. 6(a) and (b), respectively, show the output of the attenuator $A_1$ when the attenuation factor is $\alpha_1$ and when the attenuation factor is $\alpha_2$. FIG. 6(c) shows the output of the attenuator $A_2$. FIG. 6(d) shows curves obtained by overlapping the curve in FIG. 6(b) with that of FIG. 6(c). FIG. 6(e) shows an image information signal IO from the comparator $C_1$ which has a certain nonzero level only when $IS_1 \times \alpha_2$ is greater than $IS_2 \times \beta_i$, i.e., only in the case of red picture elements while having a zero level in the case of other than red picture elements. Even if the luminance of the red color in the original changes, the relative relationship between $IS_1 \times \alpha_2$ and $IS_2 \times \beta_i$ does not change, so correct color discrimination can be achieved.

Although the above description has been with reference to the case where the specific color is red (whose complementary color is cyan), the invention is also applicable to the other specific colors such as blue (whose complementary color is yellow), and green (whose complementary color is magenta).

Figure 7:
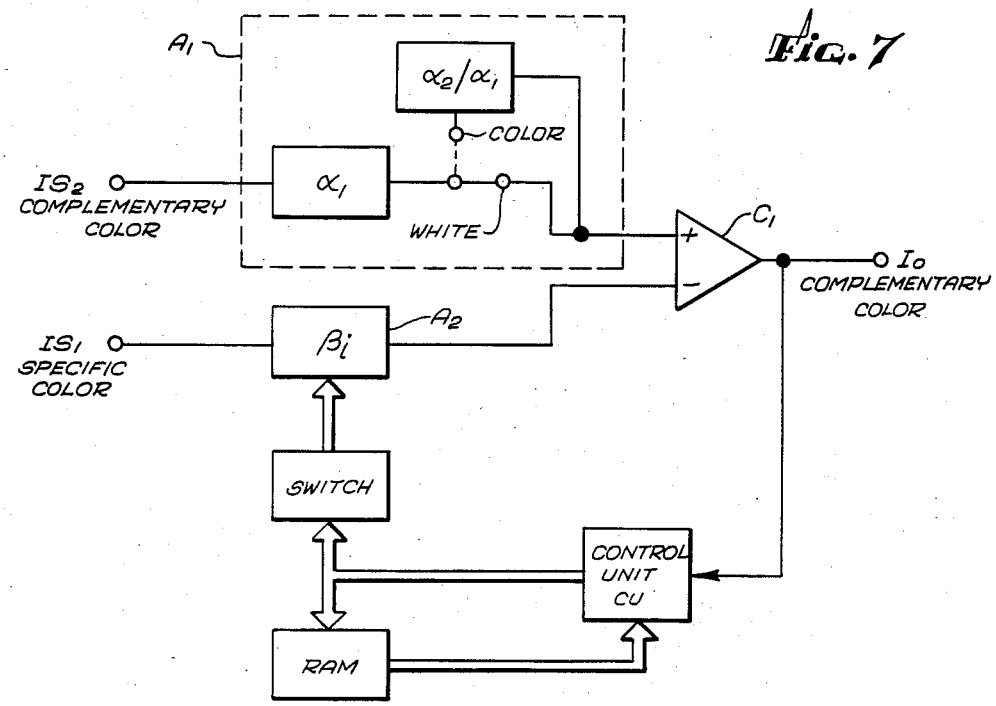
FIG. 7 is a block diagram illustrating the embodiment of an image signal separation unit according to the present invention shown in FIG. 2 being used to obtain an image signal of a complementary color.

If the relationship between the specific color and its complementary color is reversed, that is the picture elements are of the complementary color and the image signal of the complementary color is applied to the attenuator $A_1$ while the image signal of the specific color is applied to the attenuator $A_2$, as shown in FIG. 7, a color-separated image signal of the complementary color can similarly be obtained.

FIGS. 9(A)-9(e) are graphical representations, like those shown in FIGS. 6(a)-6(e) with respect to FIG. 2, for the situation illustrated in FIG. 7 in which a color-separated image signal of an original containing the complementary color is obtained.

Figure 8:
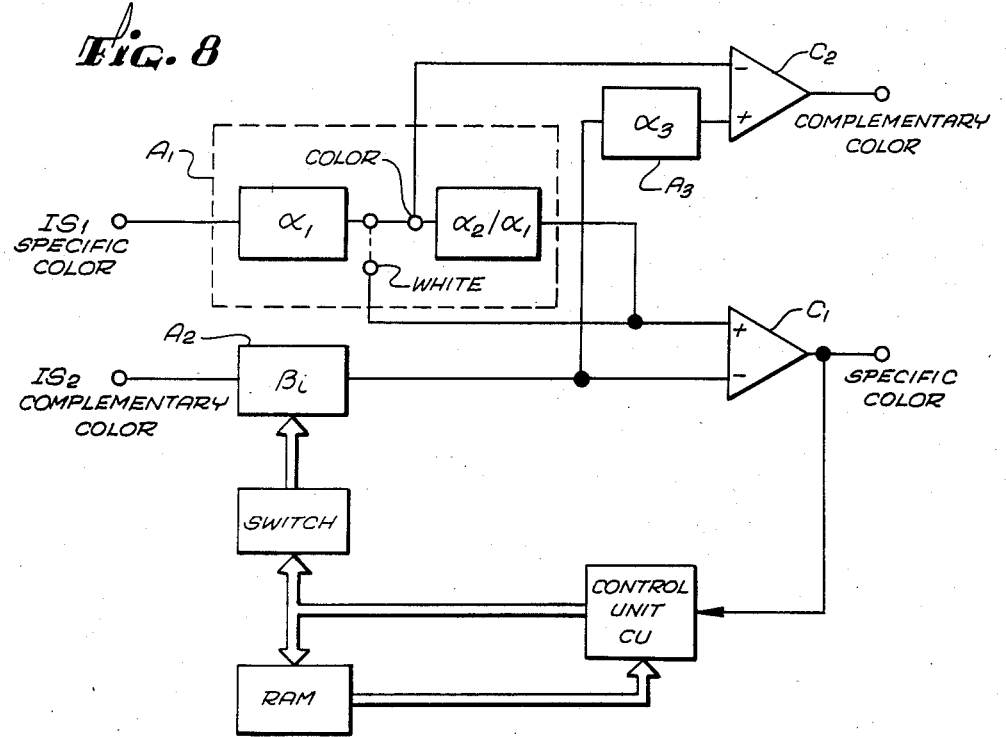
FIG. 8 is a block diagram illustrating another embodiment of an image signal separation unit according to the present invention.

Referring to FIG. 8, when a color-separated signal is intended to be obtained for the complementary color as well as for the specific color, the signal $IS_2 \times \beta_i$ is further attenuated by a factor of $\alpha_3$ by means of an attenuator $A_3$. The attenuation factor $\alpha_3$ is preferably around 0.1-0.2. In comparator $C_2$, $IS_1 \times \alpha_1$ is compared with $IS_2 \times \beta_i \times \alpha_3$. In this case, for picture elements of the complementary color, the image signal of the complementary color does not change remarkably with respect to the white color part, while the image signal for the specific color changes significantly so that the difference between both image signals is clearly detected by comparator $C_2$, to thereby obtain a color-separated signal of the complementary color.

FIGS. 10(a) and (b), repsectively, show the output of the attenuator $A_1$ when the attenuation factor is $\alpha_1$ and when the attenuation factor is $\alpha_2$. FIG. 10(c) shows the output of the attentuator $A_2$. FIG. 10(f) shows the output of the attenuator $A_3$. FIG. 10(d) shows curves obtained by overlapping the curve in FIG. 10(b) with that of FIG. 10(c) while FIG. 10(g) shows curves obtained by overlapping the curve in FIG. 10(a) with that of FIG. 10(f). FIG. 10(e) shows the output of the comparator $C_1$ which has a certain non-zero level only when $IS_1 \times \alpha_2$ is greater than $IS_2 \times \beta_i$, i.e., only in the case of red picture elements, while having a zero level in the case of other than red picture elements. Similarly, FIG. 10(h) shows an image information signal from the comparator $C_2$ which has a certain non-zero level only when $IS_2 \times \beta_i \times \alpha_3$ is greater than $IS_1 \times \alpha_1$, i.e., only in the case of cyan picture elements.

What is claimed is:

1. A method for processing an image signal in which an image signal of a specific color is separated from a light signal containing image information of picture elements in a scanning line, said method comprising the steps of:

splitting said light signal into a first light signal containing image information of the specific color and a second light signal containing image information of the complementary color with respect to said specific color;

photoelectrically converting said first and second light signals to first and second electrical signals corresponding respectively thereto;

applying a white balancing correction to said first and second electrical signals by adjusting the level of at least one of said electrical signals with the adjustment determined for each picture element by adjusting the relative levels of said first and second electrical signals corresponding to the picture elements in a scanning line of a reference area so that said first and second electrical signals are equal to each other for each picture element in the scanning line; and producing said image signal of the specific color from said two electrical signals to which said white balancing correction has been applied by comparing said first electrical signal and said second electrical signal to each other for each picture element and producing a signal in response to said comparison, said signal having a value for a picture element for which said first electrical signal exceeds second electrical signal that differs from the value for a picture element for which said second electrical signal exceeds said first electrical signal.

2. A method for processing an image signal as in claim 1 wherein said splitting step comprises dividing said light signal into two components by the use of a semi-transparent mirror, and passing one component through a first filter having transmission characteristics for the specific color and the second component through a second filter having transmission characteristics for the complementary color with respect to said specific color, whereby said first light signal and said second light signal are obtained.

3. A method for processing an image signal as in claim 1 wherein said splitting step is carried out by a dichroic mirror.

4. A method for processing an image signal as in claim 1 wherein said white balancing correction step is carried out by attenuating said first and second electrical signals by a first attenuator circuit and a second attenuator circuit, respectively, an attenuation factor for either one of said attenuator circuits being determined and set for each picture element in a scanning line of a reference area so that said first and second electrical signals corresponding to said picture elements in the scanning line of the reference area are equal to each other for each picture element in the scanning line of the reference area after the other attenuator circuit has been set to make the corresponding electrical signal less than the other electrical signal for each picture element in the scanning line of the reference area.

5. A method for processing an image signal as in claim 4 wherein the reference area comprises white picture elements in the scanning line, and the attenuation factor determined for each picture element is stored in a memory.

6. A method for processing an image signal as in claim 1 wherein said producing step includes selecting the signal corresponding to said specific color from said two electrical signals to which said white balancing correction has been applied, attenuating said selected signal by a predetermined attenuation factor, and comparing the signal thus attenuated with the signal corresponding to said complementary color, said attenuated signal corresponding to said specific color being less than said signal corresponding to said complementary color except for those parts of the signal corresponding to picture elements of said specific color, thereby separating and producing the image signal of said specific color.

7. An apparatus for processing an image signal of an original in which an image signal of a specific color is separated from a light signal containing image information of picture elements in a scanning line, comprising:
   means for splitting said light signal into a specific color component and a complementary color component using filters and for photoelectrically converting these components to obtain, respectively, a specific color image signal and a complementary color image signal;
   first and second attenuator circuits for attenuating said specific color image signal and said complementary color image signal, respectively, each said circuit having an attenuation factor value for each picture element in a scanning line;
   a comparator for comparing outputs of said attenuator circuits with each other;
   a white balancing correction means for determining and storing the attenuation factor value for either of said attenuator circuits for each picture element in a scanning line so that said outputs of said attenuator circuits as compared by said comparator are equal to each other for each picture element when a white part of the original is scanned, whereby said attenuator circuits apply a white balancing correction to said specific color image signal and said complementary color image signal; and
   means for changing the attenuation factor values of said first attenuator circuit to increase the attenuation of said specific color image signal for each picture element in a scanning line after said white balancing correction means determines and stores said attenuation factor values for applying said white balancing correction;
   whereby a separated image signal of the specific color is obtained from said comparator based on a comparison of changes in levels of said attenuated complementary color and specific color image signals.

8. A method for generating in a color image reader a color-separated information signal indicative of the placement of a specific color on an object, said method comprising:
   generating, using an optical system, first and second reference image beams of light of selected picture elements of a reference, said first beam comprising predominantly light of said specific color and said second beam comprising predominantly light of the color complementary to said specific color, said selected picture elements of said reference containing both said specific color and said complementary color;
   converting, using first and second photosensor arrays, said first and second reference image beams of light into first and second reference electrical signals, respectively, each reference electrical signal comprising a plurality of signal elements, each signal element corresponding to a particular picture element of said selected reference;
   directing said first reference electrical signal into a first electronic circuit having a first output and directing said second reference electrical signal into a second electronic circuit having a second output;
   adjusting at least one of said electronic circuits for each signal element and comparing said first and second reference electrical signals at said first and second outputs to each other for the corresponding signal elements of said first and second reference electrical signals so that the corresponding signal elements of said first and second reference electrical signals are equal to one another at said first and second outputs;
   storing said adjustments in a memory for later readout to programmably adjust said at least one electronic circuit according to said stored adjustments;
   generating, using said optical system, first and second object image beams of light of selected picture elements of an object, said first object image beam comprising predominantly light of said specific color relative to light of said color complementary to said specific color, and said second object image beam comprising predominantly light of said color complementary to said specific color relative to light of said specific color;
   converting, using said first and second photosensor arrays, said first and second object image beams of light into first and second object electrical signals, respectively, each object electrical signal comprising a plurality of signal elements, each signal element corresponding to a particular picture element of said object;
   programmably adjusting said at least one electronic circuit according to said stored adjustments read out from said memory, providing a selected attenuation to said first electronic circuit for the purpose of attenuating said first object electrical signal a selected amount for each picture element, and directing said first object electrical signal and said second object electrical signal into said first electronic circuit and said second electronic circuit, respectively, to which said programmable adjustments have been made and to which said selected attenuation has been provided, whereby said first object electrical signal present at said first output is less than said second object electrical signal present at said second output except for those signal elements of said signals corresponding to picture elements of said specific color; and comparing, in a comparator, said first object electrical signal present at said first output and said second object electrical signal present at said second output, whereby the color-separated information signal indicative of the placement of the specific color in said object is obtained.

9. A method as in claim 8 wherein said reference is a white part of said object.

10. A method as in claim 8 wherein said reference is included as a part of said color image reader.

11. A method as in claim 8 wherein said step of adjusting at least one of said electronic circuits for each signal element and comparing said first and second reference electrical signals at said first and second outputs comprises attenuating said first reference electrical signal a selected amount using a first attenuator and selectively attenuating said second reference electrical signal an amount selected for each signal element using a programmable second attenuator so that the corresponding signal elements of said first and second reference electrical signals are equal to one another at said first and second outputs.

12. A method of performing a white balancing operation for a color image reader and a subsequent color discrimination operation for a specific color on an object comprising:

(a) imaging a white area with an optical system having a first scanned photosensor array to which light of a specific color is predominantly transmitted and a second scanned photosensor array to which light of the color complementary to said specific color is predominantly transmitted to produce from said first scanned photosensor array and said second scanned photosensor array, respectively, first and second white area image signals having signal elements corresponding to particular portions of said white area;

(b) directing said first and second white area image signals through first and second electronic circuits, respectively, and selectively attenuating at least one of said white area image signals by adjusting the corresponding electronic circuit so that said first and second white area image signals are equal to one another for each signal element at the outputs of said first and second electronic circuits;

(c) imaging a portion of said object with said optical system to produce from said first scanned photosensor array and said second scanned photosensor array, respectively, first and second object image signals having signal elements corresponding to portions of said object;

(d) directing said first and second object image signals through said first and second electronic circuits adjusted as in (b) above and providing in said first electronic circuit an attenuator for attenuating said first object image signal, whereby said first object image signal is less than said second object image signal for the corresponding signal elements of said signals, except for those signal elements corresponding to portions of said object which are of said specific color, at the outputs of said first and second electronic circuits; and (e) comparing the outputs of said first and second electronic circuits and generating a digital signal of one value when the output of said first electronic circuit is greater than that of said second electronic circuit and a digital signal of another value when the output of said first electronic circuit is not greater than that of said second electronic circuit, whereby a color discrimination operation for said specific color is performed.

13. A method as in claim 12 wherein the step of selectively attenuating at least one of said white area image signals is performed by adjusting a programmable attenuator located in one of said electronic circuits, the adjustments for which are then stored in a memory and read out to selectively attenuate said at least one of said image signals.

14. A method as in claim 12 wherein the step of providing an attenuator comprises providing an attenuator which attenuates said first object image signal by a factor in the range of approximately 5 to 10.

* * * * *